Aug. 31, 1954    H. J. ASHER    2,687,749
HOSE CONSTRUCTION
Original Filed Feb. 23, 1945
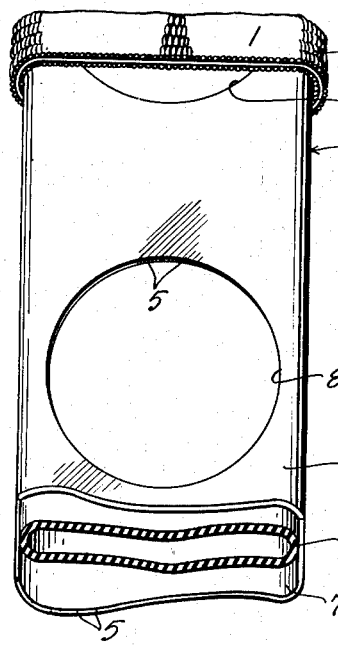
Fig. 1.
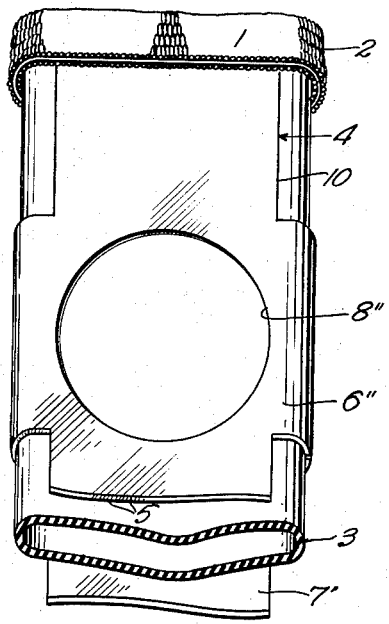
Fig. 2.
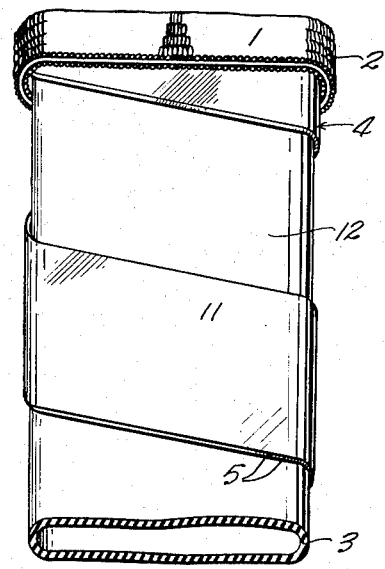
Fig. 3.
INVENTOR.
Hobert J. Asher
BY
ATTORNEY.

Patented Aug. 31, 1954

2,687,749

UNITED STATES PATENT OFFICE 2,687,749

HOSE CONSTRUCTION

Hobert J. Asher, Bristow, Okla.

Original application February 23, 1945, Serial No. 579,460, now Patent No. 2,528,409, dated October 31, 1950. Divided and this application September 27, 1950, Serial No. 187,049

4 Claims. (Cl. 138—53)

This invention relates to hose, particularly to hose of the type which may be used as fire hose and for similar purposes and which may be folded flat when stowed.

This is a division of my co-pending application, Serial No. 579,460, filed February 23, 1945, now Patent No. 2,528,409.

In the fabrication of hose of the type indicated, it has been a common practice to provide suitable lengths of tubular flexible casing, usually a heavy woven cotton fabric, and like lengths of tubular lining, such as rubber, to fit within the casing. The liner is then coated with a suitable cement whereupon it is drawn into the casing and is inflated to produce pressure between the lining and casing. Heat is then applied, usually through the use of live steam which is also used to supply the pressure to hold the elements in intimate contact during vulcanization of the lining to the interior wall of the casing.

It is desirable that hose of the type described, be flexible when in use and also that it be so constructed that it may be stowed flat to facilitate stowage and conserve space. To accomplish these desirable characteristics and others, it is the primary object of the invention to provide an improved hose, and an improved method of securing the tubular lining within a hose so that desirable flexibility is maintained, and yet undue stresses are avoided in any portion of the hose structure, either when in use or in stowage.

Another object is to provide a hose which has desired durability and flexibility when used for its intended purpose.

A further object is to provide a hose in which a stencil ply is interposed between the tubular lining and the casing, such ply being so constructed and arranged that pre-selected portions of the surface of the lining are exposed to contact with, and secured to, the overlying casing.

Another and more specific object of the invention is to provide a hose in which stencil plies are applied to opposite sides of the hose lining, said lining having a coat of cement applied thereto whereby a bond is provided between the lining and the stencil ply, and also between the lining and the casing, at those areas exposed through or adjacent such ply.

The foregoing objects, together with further objects, will be more fully apparent from the following description taken in connection with the accompanying drawings in which:

Figure 1 is a cutaway view showing the hose construction in which one form of stencil ply is used.

Fig. 2 shows a modification of the embodiment shown in Fig. 1, portions of the stencil ply being cutaway to provide intermittent bonding of the edges of the lining to the casing; and Fig. 3 illustrates the use of a stencil ply which is wound spirally about the hose lining.

In the drawing, there is shown at 1, the end of a length of heavy flexible casing which is creased at its edges at 2. It is intended that this casing shall be provided with an impervious tubular lining 3 which is of substantially the same size and configuration as the interior of the casing 1, and which shall be attached to the casing in a manner that desired characteristics in the completed hose shall be had.

To this end the present invention contemplates the use of a stencil ply, shown generally at 4, which is interposed between the casing 1 and the lining 3. This stencil ply may assume various forms as is illustrated in the respective figures of the drawings, to which reference will be specifically made.

The stencil ply 4 may comprise any suitable material, but is desirably of such construction, and so treated, that an intimate bond may be had between the stencil ply and the lining 3, and also that a minimum of abrasion results from movement between such material and the interior of the casing 1. To this end I preferably use a material comprising a rubberized bias-cut fabric, either woven or consisting of parallel strands 5 which are interbonded into a sheet form by the impregnating material thereof.

In the form of the invention shown in Fig. 1, the stencil ply 4 comprises elongated strips 6' and 7', each of which is provided with openings 8' at spaced intervals. The essential feature is that the invention shall be carried out in such manner that the desired strength, durability, and ease of handling, and stowing shall be had.

Preliminary to the assembling of the casing 1 and the lining 3, the lining is first given one or more coats of a cement that will provide desired bonding between the lining and the superposed material. Preferably this cement is a vulcanizing cement so that bonding is effected through the application of both pressure and heat. After the cement has been applied, the respective plies 6' and 7' are brought into intimate engagement with the upper and lower surfaces of the lining whereby the lining and the stencil plies are held in assembled relation. The lining assembly is then drawn into the casing 1, and pressure and heat are applied to effect vulcanization between the lining 3 and the superposed materials throughout the periphery of the lining.

In accordance with the procedure just described, it seems apparent that the plies 6' and 7' are intimately bonded to the lining 3. It is also apparent that intimate bonding takes place between the lining 3 and the interior of the casing 1 in those areas which are not covered by the plies 6' and 7'. Inasmuch as no cement is applied to the outer surface of the plies 6' and 7' no bond is effected between the outer surfaces of the plies and the wall of the casing 1.

In the hose constructed in the above manner, there is a lining-to-casing bond over a relatively small portion of the opposed lining and casing surfaces. Such area of bonding is sufficient, however, to avoid any wrinkling and resulting damage, to the lining when the hose is subjected to the stresses arising from normal use. Inasmuch as the material of the lining is resilient, necessary deformation due to flattening of the hose for stowing or deformation required for flexing of the hose when in use can readily take place. At the same time, the hose possesses desired flexibility and minimizes the rate of deterioration from normal and intended use.

In the modification shown in Fig. 1, stencil plies 6' and 7' are of sufficient width to completely or substantially overlie a diameter of the lining 3. In this embodiment openings 8' in the stencil plies are relatively large so that the percentage of interbonded area is sufficient to attain the desired results above set forth. If it is desired in this embodiment to provide some bonding at the edges 2, the width of the plies are adjusted accordingly. If such bonding is not desired, the plies 6' and 7' will be at least of the width of the diameter, of the lining 3 or may comprise a single piece of a width to completely surround the lining.

Fig. 2 is a modification of the construction shown in Fig. 1. In this embodiment the stencil plies 6'' and 7'' are cut away at intervals along their edges as shown at 10. The openings 8'' are reduced somewhat in size from that shown in Fig. 1, and in this manner the percentage area of bonding of the liner 3 to the casing 1, as provided by the openings 8'' and the cutaway areas 10, is substantially the same as that shown in the preceding Fig. 1. In the example given above, the area over which interbonding takes place between the lining 3 and the casing 1 is approximately twenty-five percent (25%) of the total peripheral area of the lining, although it is to be understood that the invention is not confined to this specific percentage of bonding area.

In the embodiment of Fig. 3, the stencil ply 4 is shown as a single strip 11 which is wound spirally about the lining 3 at such a pitch that the exposed area 12 provides adequate interbonding between the lining and the casing 1, but which, at the same time, provides desirable flexibility and other characteristics of the hose.

From the foregoing description there is shown a novel hose construction and method of making, whereby there is provided desired characteristics in a hose of the type and for the purposes described.

Broadly the invention comprehends a hose, and method of making, whereby difficulties heretofore experienced are minimized.

Having thus described the invention, what is claimed as new and desired to be secured by Letters Patent is:

1. In a hose construction the combination of an elongated, tubular casing having opposed, creased, longitudinal edges; a tubular lining in said casing; and a perforated stencil ply interposed between said lining and casing, said ply having spaced, cutaway portions along the creased edges, there being a lining-to-casing bond only at areas devoid of said ply, and said casing being bonded to the lining only.

2. In a hose construction the combination of an elongated, tubular casing having opposed, creased, longitudinal edges; a tubular lining in said casing; and a stencil ply extending longitudinally of and interposed between said lining and casing, said ply having spaced, cutaway portions along the creased edges and intermediate openings alternating with said cutaway portions, there being a lining-to-casing bond at said cutaway portions and openings, and said casing being bonded to the lining only.

3. A hose comprising a tubular casing having opposed, creased, longitudinal edges; a tubular lining therein having a smooth outermost surface; a stencil ply extending longitudinally of and interposed between said lining and the casing, said ply having opposed rows of longitudinally spaced openings, each row being between said creased edges; and means bonding said surface to the ply and to the casing at said openings, said casing being otherwise freely shiftable relative to said ply.

4. A hose comprising a tubular casing having opposed, creased longitudinal edges; a tubular lining therein having a smooth outermost surface; a pair of opposed stencil plies extending longitudinally of said lining between the latter and said casing in substantially surrounding relationship to said lining, each ply being provided with a row of opposed longitudinally spaced openings; and means bonding said surface to the plies and to the casing at said openings, said casing being otherwise freely shiftable relative to said plies.

References Cited in the file of this patent

UNITED STATES PATENTS

| Number | Name | Date |
| --- | --- | --- |
| 935,086 | Baird | Sept. 28, 1909 |
| 1,149,664 | Many | Aug. 10, 1915 |
| 1,164,304 | Nicewarner | Dec. 14, 1915 |
| 1,220,661 | Many | Mar. 27, 1917 |
| 1,625,810 | Krichbaum | Apr. 26, 1927 |
| 1,970,802 | Johnson | Aug. 21, 1934 |
| 2,321,064 | Broedling | June 8, 1943 |
| 2,528,409 | Asher | Oct. 31, 1950 |

FOREIGN PATENTS

| Number | Country | Date |
| --- | --- | --- |
| 549,902 | Great Britain | Dec. 14, 1942 |